United States Patent
Neelakantan et al.

(10) Patent No.: US 8,983,745 B2
(45) Date of Patent: Mar. 17, 2015

(54) SYSTEM AND METHOD OF EXECUTING A DOUBLE TRANSITION SHIFT IN A TRANSMISSION WITH TRANSITIONING CLUTCH HAVING OPPOSITE CLUTCH SLIP AND TORQUE CARRYING DIRECTIONS

(71) Applicant: GM Global Technology Operations LLC, Detroit, MI (US)

(72) Inventors: Vijay A. Neelakantan, Rochester Hills, MI (US); Nathaniel E. Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 13/794,915

(22) Filed: Mar. 12, 2013

(65) Prior Publication Data

US 2014/0277977 A1 Sep. 18, 2014

(51) Int. Cl.
F16D 48/06 (2006.01)

(52) U.S. Cl.
CPC .................. F16D 48/06 (2013.01)
USPC ........................................................ 701/68

(58) Field of Classification Search
CPC ......... F16H 61/02; F16H 61/04; F16H 61/06; F16H 61/08; F16H 61/18; F16H 61/68; F16H 61/684; F16H 61/686; F16H 3/66; F16H 59/02; F16H 59/36; F16H 59/38; F16H 59/48; F16D 48/66; F16D 2048/281; F16D 2500/7042; F16D 2500/7044; F16D 2500/30818; F16D 2500/30827; F16D 2500/70406; F16D 2500/70418; F16D 48/06; F16D 701/68

USPC .............. 477/154, 155, 148, 149; 701/51–59, 701/60–61, 66, 68
See application file for complete search history.

(56) References Cited

U.S. PATENT DOCUMENTS

| | | | | | |
|---|---|---|---|---|---|
| 2,934,976 | A | * | 5/1960 | Herndon | 477/64 |
| 4,070,927 | A | * | 1/1978 | Polak | 475/286 |
| 4,263,822 | A | * | 4/1981 | Harmon | 477/64 |
| 5,014,573 | A | * | 5/1991 | Hunter et al. | 477/61 |
| 5,072,631 | A | * | 12/1991 | Fujimoto et al. | 477/111 |
| 5,113,343 | A | * | 5/1992 | Hunter et al. | 701/51 |

(Continued)

OTHER PUBLICATIONS

Hussein Dourra, Ali Mourtada; "Adaptive nth Order Lookup Table used in Transmission Double Swap Shift Control"; SAE International; Apr. 14-17, 2008; 2008-01-0538; Warrendale, PA.

(Continued)

Primary Examiner — Calvin Cheung
Assistant Examiner — Allen E Quillen
(74) Attorney, Agent, or Firm — Quinn Law Group, PLLC

(57) ABSTRACT

A method of executing a double transition shift in a transmission includes determining via a controller that one of four clutches involved in the shift has a clutch slip direction relative to input member rotation direction in one of the current gear and the commanded gear and an opposite clutch torque direction relative to input member torque direction in the other of the current gear and the commanded gear. The controller then calculates clutch torques for at least some of the offgoing clutches and at least some of the oncoming clutches, and controls torque at the offgoing clutches and the oncoming clutches during the shift according to the calculated clutch torques to ensure that the clutch with the opposite slip and torque directions does not provide reaction torque during the shift unless clutch slip across said one of the four clutches is zero or in the clutch torque direction.

19 Claims, 7 Drawing Sheets

(56) References Cited

U.S. PATENT DOCUMENTS

| | | | |
|---|---|---|---|
| 5,342,258 A * | 8/1994 | Egyed | 475/281 |
| 6,656,087 B1 * | 12/2003 | Runde et al. | 477/107 |
| 7,056,263 B2 | 6/2006 | Whitton | |
| 7,238,131 B2 * | 7/2007 | Raghavan et al. | 475/5 |
| 7,282,004 B2 * | 10/2007 | Raghavan et al. | 475/5 |
| 7,494,435 B2 * | 2/2009 | Bucknor et al. | 475/5 |
| 7,559,876 B2 * | 7/2009 | Runde et al. | 477/125 |
| 7,670,242 B2 * | 3/2010 | Bucknor et al. | 475/5 |
| 7,890,237 B2 * | 2/2011 | Kuwahara et al. | 701/51 |
| 7,894,965 B2 * | 2/2011 | Dourra et al. | 701/58 |
| 8,135,521 B2 * | 3/2012 | Sugiura et al. | 701/52 |
| 8,308,608 B2 * | 11/2012 | Wilke et al. | 477/76 |
| 8,439,804 B2 * | 5/2013 | Hagelskamp | 477/156 |
| 8,483,919 B2 * | 7/2013 | Byerly et al. | 701/60 |
| 2012/0123654 A1 * | 5/2012 | Byerly et al. | 701/60 |
| 2012/0191310 A1 * | 7/2012 | Whitton et al. | 701/68 |
| 2012/0265383 A1 * | 10/2012 | Kaminsky et al. | 701/22 |
| 2013/0008754 A1 * | 1/2013 | Wilke et al. | 192/3.54 |
| 2013/0197715 A1 * | 8/2013 | Otanez et al. | 701/2 |
| 2013/0263683 A1 * | 10/2013 | Neelakantan et al. | 74/335 |
| 2013/0281246 A1 * | 10/2013 | Neelakantan et al. | 475/120 |
| 2014/0051543 A1 * | 2/2014 | Dourra et al. | 475/286 |
| 2014/0121914 A1 * | 5/2014 | Neelakantan et al. | 701/53 |

OTHER PUBLICATIONS

Hussein Dourra, David Kwapis; "Development of Output Torque Equation for Double Swap Shift Control"; SAE International; Apr. 16-19, 2007; 2007-01-1308; Warrendale, Pa.

* cited by examiner

SYSTEM AND METHOD OF EXECUTING A DOUBLE TRANSITION SHIFT IN A TRANSMISSION WITH TRANSITIONING CLUTCH HAVING OPPOSITE CLUTCH SLIP AND TORQUE CARRYING DIRECTIONS

TECHNICAL FIELD

The present teachings generally include an automatic transmission and a control method for implementing a double transition shift in the transmission.

BACKGROUND

An automatic transmission has a plurality of selectively engageable clutches engageable in different combinations to establish multiple different gears having different ratios of torque of an output member to torque of an input member. A controller can command that the transmission shift between the different gears in response to driver input, or in response to vehicle operating conditions such as vehicle speed, input or output torque, and other conditions.

Some transmissions may be configured so that a shift between two gears is a double transition shift. A double transition shift requires that two of the clutches that are engaged in the current gear be disengaged in the commanded gear, and two other clutches not engaged in the current gear be engaged in the commanded gear. These are referred to as transitioning clutches. Double transition shifts generally require slipping at least some of the transitioning clutches during the shift. However, if one of the clutches involved in the shift has a slip direction in the current gear and an opposite torque direction (i.e., direction in which the clutch carries torque) in the commanded gear, or a torque direction in the current gear and an opposite slip direction in the commanded gear, then that clutch cannot provide reaction torque during the shift and still allow a desired output torque and input acceleration during the shift.

SUMMARY

A method of controlling a transmission is provided that identifies such a problematic double transition shift and controls clutch torques during the shift to ensure that the clutch identified as having a different slip direction in the one of the current gear and the commanded gear versus torque direction in the other of the current gear and the commanded gear is not required to provide a reaction torque during the shift until slip speed at the clutch is zero or in the same direction as the required torque direction. For example, clutch torques are controlled according to a stored set of equations based on kinematic analysis that relate clutch torque to at least some of output member torque, input member torque, input member acceleration, and clutch slip acceleration. Input torque can be controlled according to the stored set of equations that relate input member torque to at least some of the calculated clutch torques, input member acceleration, and clutch slip acceleration. The method can be implemented to control double transition upshifts and double transition downshifts, whether the upshifts or downshifts are skip shifts or single gear shifts.

Specifically, a method of executing a double transition shift in a transmission having a plurality of selectively engageable clutches engageable in different combinations to establish multiple different gears with gear ratios of torque of an output member to torque of an input member includes receiving a command for a double transition shift from a current gear to a commanded gear. The double transition shift requires at least four clutches including a first offgoing clutch and a second offgoing clutch that are engaged in the current gear and not engaged in the commanded gear, and a first oncoming clutch and a second oncoming clutch that are not engaged in the current gear and are engaged in the commanded gear.

The method includes determining via a controller that one of the four clutches has a clutch slip direction relative to input member rotation direction in one of the current gear and the commanded gear and an opposite torque direction relative to input member torque direction in the other of the current gear and the commanded gear (i.e., "the required torque direction").

The controller then calculates clutch torques for at least some of the offgoing clutches and at least some of the oncoming clutches, and controls torque at the offgoing clutches and the oncoming clutches during the shift according to the calculated clutch torques to ensure that the clutch with the opposite slip and torque directions does not provide reaction torque during the shift unless clutch slip across that clutch is zero or in the same direction as the required torque direction.

The method can include controlling the input member torque as well as torques of various ones of the clutches during different phases of the shift so that output member torque, clutch acceleration, and input member acceleration are at desired levels. Additionally, closed loop control of at least some of the clutch torques can be carried out during the clutch shift.

A transmission system with clutches and a controller that controls the clutches to carry out the shift as recited is also provided.

The method can be used for double transition shifts for which previous known methods cannot be used. For example, a simultaneous double transition shift that controls two shifting clutches simultaneously during the inertia phase cannot be used because one of the clutches cannot provide the required torque direction to yield the desired output torque and input member acceleration performance. Additionally, a skip-at-sync control of sequenced power-on downshifts cannot be used for a single transition shift where there is no intermediate gear to sequence through.

The above features and advantages and other features and advantages of the present teachings are readily apparent from the following detailed description of the best modes for carrying out the present teachings when taken in connection with the accompanying drawings.

DETAILED DESCRIPTION

Figure 1:
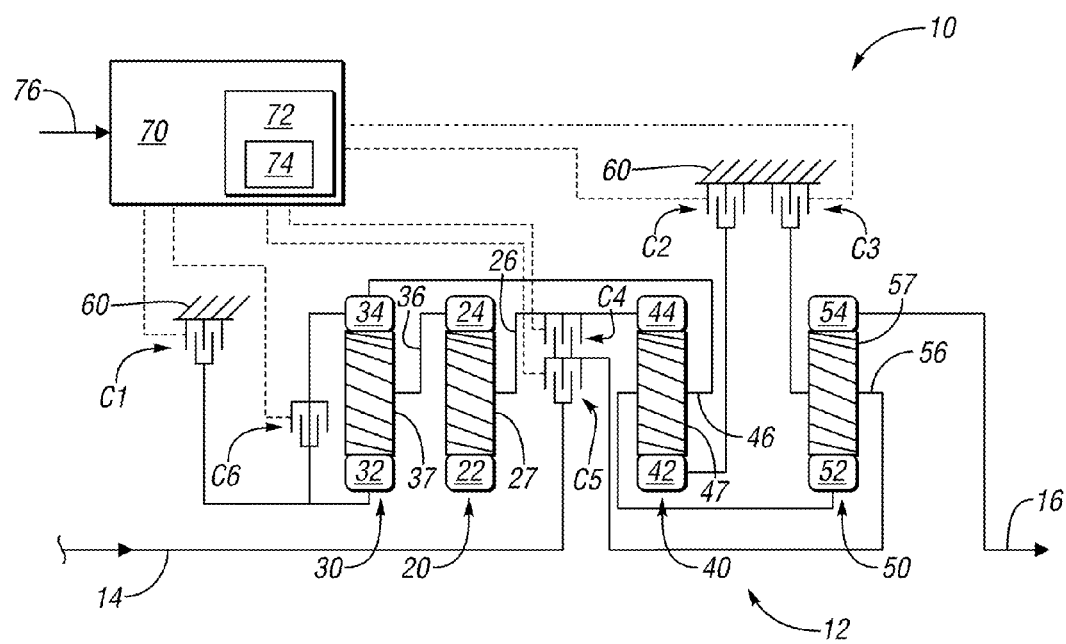
FIG. 1 is a schematic illustration of a first embodiment of an automatic transmission system in stick diagram form.

Referring to the drawings, wherein like reference numbers refer to like components, FIG. 1 shows a portion of a transmission system 10 that includes an automatic transmission 12 having a plurality of selectively engageable clutches C1, C2, C3, C4, C5 and C6 that are engageable in different combinations to establish eleven different forward gear ratios and a reverse gear ratio between an input member 14 and an output member 16 of the transmission 12. The input member 14 receives driving torque from an engine, not shown, and the output member 16 provides torque through a final drive to vehicle wheels (not shown) as is understood by those skilled in the art.

The clutch engagement schedule to establish the multiple gear ratios is shown in Table 1. An "X" indicates that a clutch is engaged and carrying torque.

TABLE 1

| Gear State | Gear Ratio | Ratio Step | C1 | C2 | C3 | C4 | C5 | C6 |
|---|---|---|---|---|---|---|---|---|
| Rev | -4.409 | | | | X | X | | X |
| Neutral | | -0.94 | X | X | X | | | |
| 1st | 4.710 | | | | | X | X | X |
| 2nd | 3.317 | 1.42 | | X | | X | X | |
| 3rd | 2.306 | 1.44 | | X | | | X | X |
| 4th | 1.964 | 1.17 | | X | X | | X | |
| 5th | 1.493 | 1.32 | | X | | | X | X |
| 6th | 1.296 | 1.15 | X | | | | X | X |
| 7th | 1.000 | 1.30 | | | | X | X | X |
| 8th | 0.867 | 1.15 | | X | | X | X | |
| 9th | 0.759 | 1.14 | | X | | | X | X |
| 10th | 0.729 | 1.04 | X | X | | | X | |
| 11th | 0.648 | 1.13 | X | | | | X | X |

The transmission 12 includes a gearing arrangement of four planetary gear sets 20, 30, 40 and 50. Each planetary gear set 20, 30, 40, 50 has a respective sun gear member 22, 32, 42, 52, ring gear member 24, 34, 44, 54, and carrier member 26, 36, 46, 56 that supports pinion gears 27, 37, 47, 57 that mesh with both the sun gear member 22, 32, 42, 52 and the ring gear member 24, 34, 44, 54.

The clutch C1 is engageable to connect the sun gear member 32 to a stationary (nonrotating) member 60 such as the transmission casing. The clutch C2 is engageable to connect the sun gear member 42 to the stationary member 60. The clutch C3 is engageable to connect the carrier member 56 to the stationary member 60. The clutch C4 is engageable to connect the continuously interconnected carrier member 26 and ring gear member 44 to the carrier member 56. The clutch C5 is engageable to connect the continuously interconnected input member 14 and sun gear member 22 to the carrier member 56. The clutch C6 is engageable to connect the sun gear member 32 to the ring gear member 34.

A controller 70 is operatively connected to each of the clutches C1-C6. The controller 70 has a processor 72 that carries out a stored algorithm 74, also referred to herein as a control module or method 500 of FIG. 9, to engage the clutches C1-C6 to establish the various gear ratios in response to input operating conditions 76 provided to the controller 70 by sensors or from other controllers, such as an engine controller.

As indicated in FIG. 1, the multiple gear ratios include a 5th gear and a 6th gear. An upshift from the 5th gear to the 6th gear is a double transition upshift as clutches C2 and C6 are offgoing clutches and clutches C1 and C5 are oncoming clutches while only clutch C4 remains engaged. Likewise, a downshift from the 6th gear to the 5th gear is a double transition shift as clutches C1 and C5 are offgoing clutches and clutches C2 and C6 are oncoming clutches. As used herein, in the upshift from 5th gear to 6th gear, C2 is the first clutch, C6 is the second clutch, C1 is the third clutch, and C4 is the fourth clutch. As used herein, in the downshift from 6th gear to 5th gear, C1 is the first clutch, C5 is the second clutch, C2 is the third clutch, and C6 is the fourth clutch.

Table 2 indicates the ratio of slip speed of each clutch with respect to the speed of the input member in each of the gear states. Table 3 indicates the ratio of torque of each clutch with respect to torque of the input member 14 in each of the gear states. It is apparent from Tables 2 and 3 that the direction of slip speed of clutch C1 in the 5th gear is opposite to the direction of torque of clutch C1 in the 6th gear. Slipping clutch C1 during an upshift from 5th gear to 6th gear, or during a downshift from 6th gear to 5th gear, will not provide the required direction of reaction torque to provide appropriate output torque and input acceleration performance during the shift.

TABLE 2

| | Rev | 1st | 2nd | 3rd | 4th | 5th | 6th | 7th | 8th | 9th | 10th | 11th |
|---|---|---|---|---|---|---|---|---|---|---|---|---|
| C1 | -0.417 | 0.391 | 0 | 0 | 0 | -0.417 | 0 | -1.000 | -1.670 | -0.417 | 0 | 0 |
| C2 | 0 | 1.387 | 1.969 | 0.716 | 0 | 0 | -2.492 | -1.000 | 0 | 0 | 0 | 0.716 |
| C3 | 0 | 0 | 0 | -0.281 | -0.441 | -0.581 | -1.000 | -1.000 | -1.000 | -1.000 | -1.000 | -1.000 |
| C4 | 0.581 | 0 | 0 | 0 | 0 | 0 | 0 | 0 | 0 | -0.419 | -0.559 | -0.719 |
| C5 | 1.000 | 1.000 | 1.000 | 0.719 | 0.559 | 0.419 | 0 | 0 | 0 | 0 | 0 | 0 |
| C6 | 0 | 0 | 0.555 | 0 | -0.371 | 0 | -1.420 | 0 | 0.952 | 0 | -0.317 | 0 |

TABLE 3

|     | Rev    | 1st    | 2nd   | 3rd   | 4th   | 5th    | 6th   | 7th    | 8th    | 9th    | 10th   | 11th   |
| --- | ------ | ------ | ----- | ----- | ----- | ------ | ----- | ------ | ------ | ------ | ------ | ------ |
| C1  | 0      | 0      | 0.757 | 1.306 | 0.757 | 0      | 0.296 | 0      | 0      | 0      | −0.095 | −0.352 |
| C2  | 1.396  | 0      | 0     | 0     | 0.207 | 0.493  | 0     | 0      | −0.133 | −0.241 | −0.175 | 0      |
| C3  | −6.805 | 3.71   | 1.559 | 0     | 0     | 0      | 0     | 0      | 0      | 0      | 0      | 0      |
| C4  | 0      | 3.56   | 3.56  | 3.56  | 3.032 | 2.304  | 1.391 | 0.756  | 0.339  | 0      | 0      | 0      |
| C5  | 0      | 0      | 0     | 0     | 0     | 0      | 0.609 | 0.788  | 1      | 1.172  | 1.126  | 1      |
| C6  | −0.757 | −0.757 | 0     | 0.549 | 0     | −0.757 | 0     | −0.161 | 0      | 0.13   | 0      | −0.352 |

Figure 9:
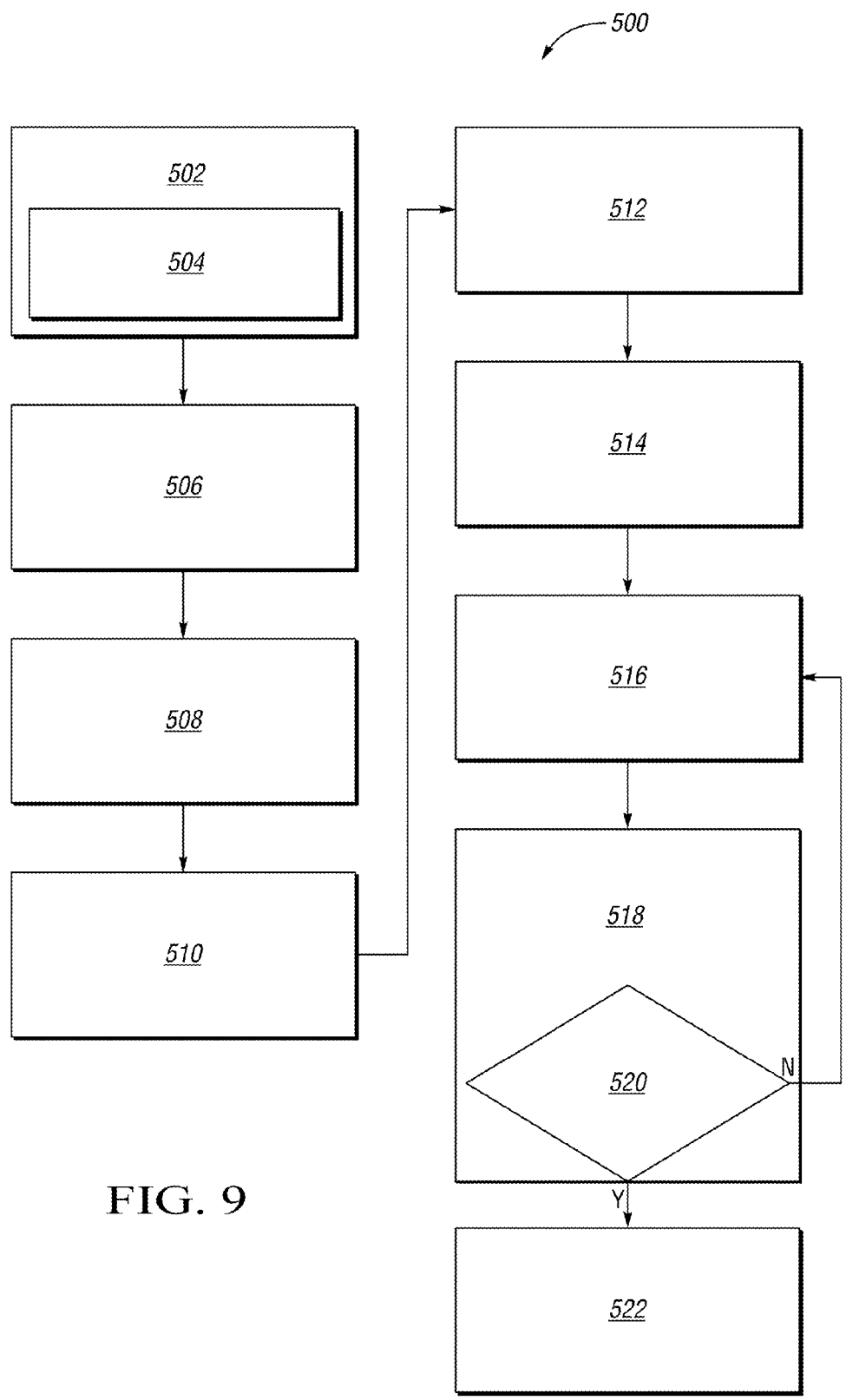
FIG. 9 is a flowchart of a method of executing a double transition shift in a transmission system such as the transmission systems of FIGS. 1 and 8.

In order to execute a double transition shift in which one of the offgoing clutches or one of the oncoming clutches has a slip direction in the current gear (offgoing gear) opposite to a required torque carrying direction (also referred to herein as the torque direction) in the commanded gear (oncoming gear), the processor 72 executes the stored algorithm 74 as described herein and shown schematically and method 500 in the flowchart of FIG. 9, by calculating clutch torques for at least some of the offgoing clutches and at least some of the oncoming clutches using a series of stored mathematical equations kinematically relating clutch torques to desired output torque, input acceleration, and other input factors depending on whether an upshift or a downshift is involved. The controller 70 then controls torque at the offgoing clutches and the oncoming clutches during the shift according to the calculated clutch torques to ensure that the clutch with the opposite slip direction and required torque carrying direction does not provide reaction torque during the shift until clutch slip (direction of rotation relative to direction of rotation of the input member 14) of the problematic clutch is zero or in the same direction as the required torque-carrying direction. Moreover, for some clutches, closed loop control is used to control the torque during the shift, as described herein.

Calculate Upshift Scheduled Torques

Figure 2:
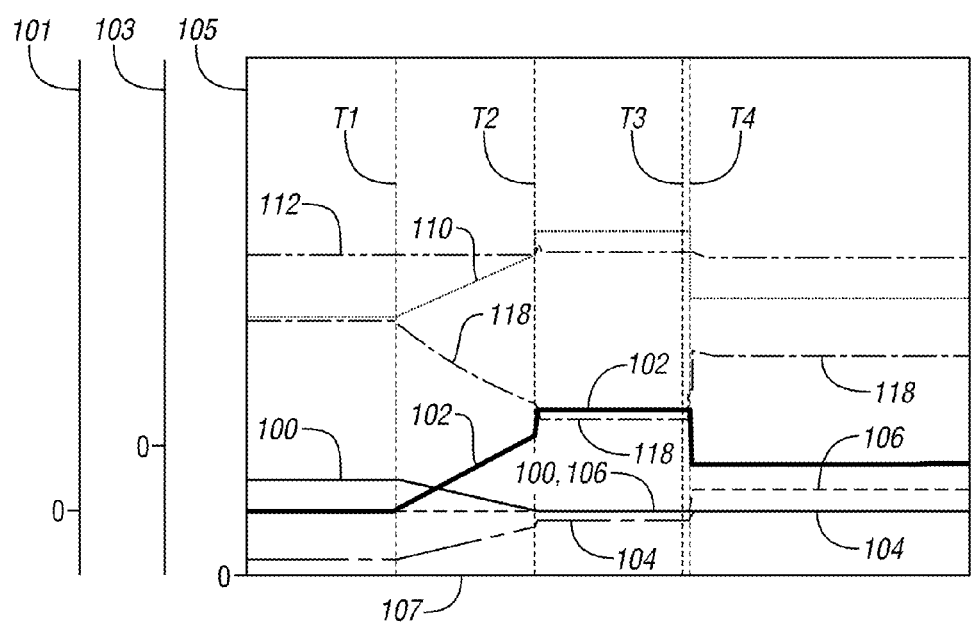
FIG. 2 is a plot of torque and torque ratio of various components of the transmission of FIG. 1 during a controlled double transition upshift in the transmission system of FIG. 1.

The method of calculating upshift torques is explained herein with reference to an example of an upshift from 5th gear to 6th gear for the transmission system 10 of FIG. 1. The controlled shift from 5th gear to 6th gear for the transmission system 10 is illustrated in FIG. 2 with clutch torque in Newton-meters (N-m) along axis 101, input member 14 torque and output member 16 torque in Newton-meters (N-m) along axis 103, and torque ratio (torque of output member 16 to torque of input member 14) along axis 105 versus time in seconds shown for various components over the shift. The transmission system 10 is in 5th gear until time T1, undergoes a controlled torque phase with torque hole fill from time T1 until time T2, undergoes a controlled combined inertia and slip phase from time T2 to time T3, a final torque ramp-up phase from time T3 to time T4, and is in 6th gear after time T4. The transition from 5th gear at time T1 to 6th gear at time T4 is according to the method 500 of FIG. 9, as described herein.

In the case of an upshift, the scheduled clutch torque values are first commanded for the torque phase. After the torque phase control is complete, the scheduled input torque and clutch torque values are commanded for the inertia phase. There are four clutches involved: (i) primary oncoming clutch PriOnc, which is clutch C5 in the example of FIG. 2; (ii) secondary oncoming clutch SecOnc, which is clutch C1 in the example of FIG. 2; (iii) primary offgoing clutch Prioffg, which is clutch C2 in the example of FIG. 2; and (iv) secondary offgoing clutch SecOffg, which is clutch C6 in the example of FIG. 2.

Assuming that the secondary oncoming clutch is the clutch with the direction of clutch slip opposite to the required torque carrying direction in the oncoming gear, as indicated of clutch C1 in Tables 2 and 3 above, the primary offgoing and primary oncoming clutches are involved in the torque phase. This is evident on FIG. 2, in which the torque 100 at clutch C2 decreases during the torque phase, and the torque 102 of the primary oncoming clutch C5 increases during the torque phase. The primary oncoming clutch C5 continues to control the profile in the inertia phase, with the assistance of controlled increasing clutch slip at the secondary offgoing clutch C6, the torque of which is shown at 104. At the end of the inertia phase, the secondary oncoming clutch C1 should have reached a slip speed (zero or required direction of rotation) in which the required direction of clutch reaction torque can be realized if the clutch C1 is engaged to provide the proper torque ratio for the commanded (oncoming) gear. FIG. 2 shows the torque 106 at the secondary oncoming clutch C1 increasing just after it is engaged at the end of the inertia phase. The primary oncoming clutch C5 is also engaged and locked, and the secondary offgoing clutch C6 which was controlling an increase in slip at its location is exhausted such that it has no torque capacity. FIG. 2 also indicates the torque 110 of the input member 14, and the torque 112 at the output member 16, which is controlled to stay constant. A plot 118 of torque ratio during the shift is shown.

Figure 3:
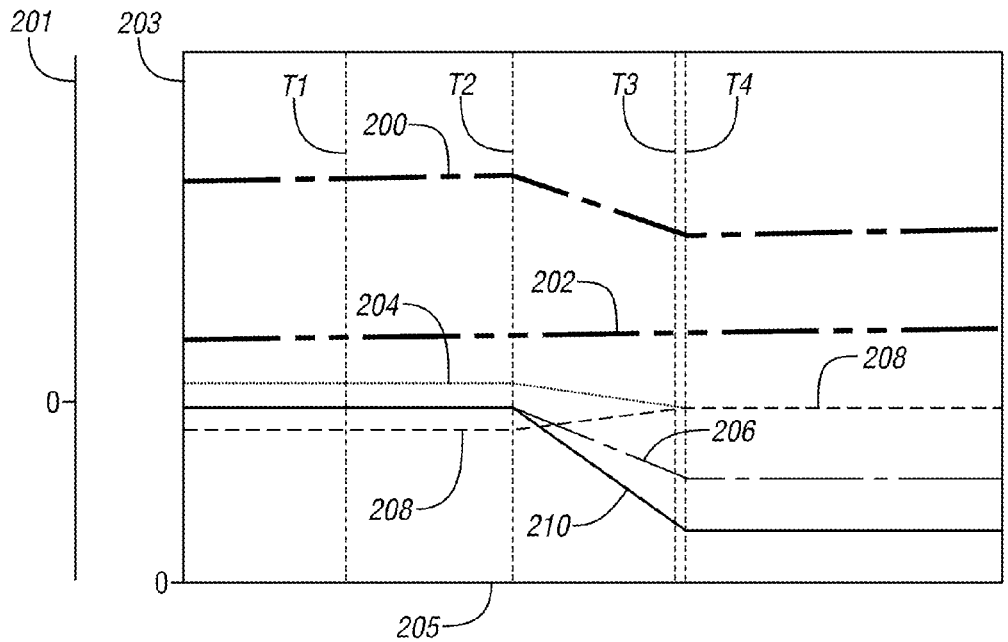
FIG. 3 is a plot of rotational speed of various components of the transmission system of FIG. 1 during the same upshift as FIG. 2.

FIG. 3 is a plot of clutch speeds in revolutions per minute (rpm) along axis 201 and engine speed in rpm along axis 203 versus time in seconds along axis 205 shown for various components over the shift from 5th gear to 6th gear for the transmission system 10 of FIG. 1. The speed 200 of the input member 14 is shown, such as may be indicated by the speed of a turbine of a torque converter connected to the input member 14. The speed 202 of the output member 16 is indicated. The speed 204 of clutch C5 is indicated. The speed 206 of clutch C6, the speed 208 of clutch C1, and the speed 210 of clutch C2 are shown.

Figure 4:
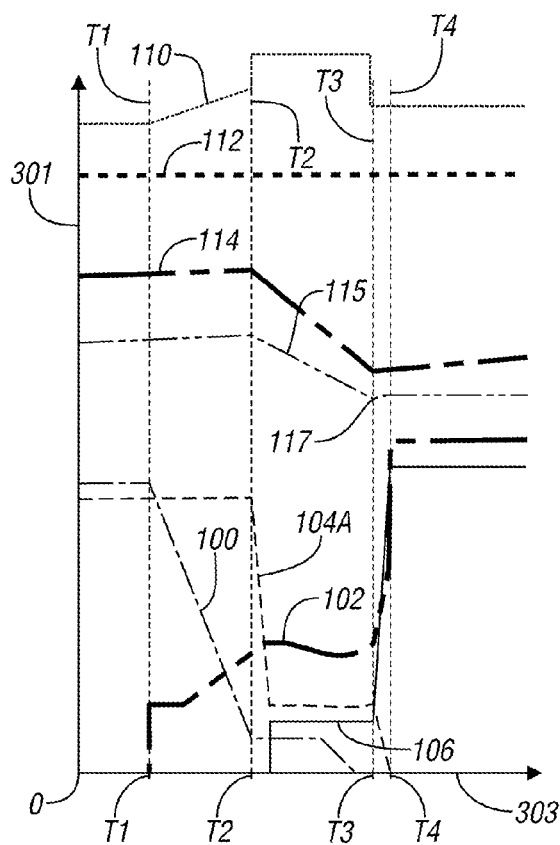
FIG. 4 is a plot of torque, rotational speed, and clutch slip speed during the same upshift as FIG. 2 of various components of the transmission system of FIG. 1.

FIG. 4 is a plot of component speeds in rpm and component torques in N-m, as applicable, on the vertical axis 301 versus time in seconds on the horizontal axis 303. It is noted that in FIG. 4, all clutch torques are shown in relative magnitude without regard to direction of rotation, so the torque 104 of clutch C6 shown as negative in plot 104 of FIG. 2 is shown as positive in plot 104A in FIG. 4. Moreover, it is noted that input torque 110 and output torque 112 are relative to a different scale than torques 100, 102, 104A, and 106. Additionally, input speed 114 and slip speed 115 of sun gear member 32 are relative to a different scale than the torque curves.

Calculation of the scheduled (i.e., commanded) clutch torque values, and input member 14 and output member 16 torque values during the torque phase is accomplished by the controller 70 based on (i) a predetermined desired torque phase time (i.e., total time from T1 to T2) for the shift, and associated required input member acceleration $\omega_{INPUT}$ and clutch accelerations that are calculated based on different desired shift times (inertia phase time from T2 to T3) and stored in a database, and (ii) stored coefficients $a_{10}$, $b_{10}$, $c_{10}$; $a_{11}$, $b_{11}$, $c_{11}$, etc., as described herein, from the stored database that are then used to solve the following equations to find input torque, output torque, and oncoming and offgoing clutch torques in terms of output torque, input torque and desired input acceleration. For example:

$$T_{PriOnc} = a_{10} T_{INPUT} + b_{10} T_{OUTPUT} + c_{10} \dot{\omega}_{INPUT} \quad (1),$$

where $T_{INPUT}$ is torque of the input member 14, $T_{OUTPUT}$ is torque of the output member 16, $\dot{\omega}_{INPUT}$ is acceleration of rotational speed of the input member 14, and $T_{PriOnc}$ is the torque of the primary oncoming clutch C5 in the example upshift of FIGS. 2-4. Similarly, $$T_{PriOffg} = a_{11} T_{INPUT} + b_{11} T_{OUTPUT} + c_{11} \dot{\omega}_{INPUT} \quad (2),$$

where $T_{PriOffg}$ is the torque of the primary offgoing clutch, C2 in the example of FIGS. 2-4. It may be possible to assume that input acceleration $\dot{\omega}_{INPUT}$ can be zero during the torque phase, so the related coefficient $c_{10}$ or $c_{11}$ may not be used. The desired torque phase time calibration can be based on the level of vehicle acceleration change associated with the shift. The factor having the greatest influence on the calibrated torque phase time is the ratio step between the offgoing gear and the oncoming gear, with a larger ratio step being associated with a longer desired torque phase time to minimize driver perception of torque disturbance.

In order to formulate the database of stored coefficients $a_{10}$, $b_{10}$, $c_{10}$; $a_{11}$, $b_{11}$, $c_{11}$, etc. that is accessed during the controlled upshift, a system of equations is used. The equations are calculated during the development of the transmission system 10 and represent the transmission system 10 by a system of free body diagram equations describing moving parts within the transmission system 10 such as described in commonly assigned U.S. Pat. No. 7,056,263, as will be well understood by those skilled in the art. More specifically, the system of equations may include torques, forces, and the like. One such system of equations that can be used to describe the transmission system 10 is:

$$\begin{bmatrix} I & \Phi^T \\ \Phi & 0 \end{bmatrix}^{-1} = [\Sigma T] = \begin{bmatrix} \dot{\omega} \\ \lambda \end{bmatrix} = S = \begin{bmatrix} s_1 \\ s_2 \\ \vdots \\ s_n \end{bmatrix}, \quad (3)$$

where T is torque of a component, $\dot{\omega}$ is angular acceleration of the rotational speed of the component in radians per second-squared; $\lambda$ represents the torque required to maintain constraints between components, $\Phi$ is a system (also in matrix form) of any velocity constraint equations and torque constraint equations that describe angular speed (radians per second), angular acceleration (radians per second-squared) and torque relationships of the relative components of the transmission system 10 connected by a rigid connection, by a gear ratio of a gear set, or indicating that components are locked (i.e., rotate in unison for a rotating clutch or is grounded (stationary) for a grounding clutch; and S is the output matrix when the system of equations is solved in terms of $\omega$ and $\lambda$. That is, each row of S is an equation s representing the acceleration $\dot{\omega}$ or the constraint torque $\lambda$ of a system component in terms of the system unknowns.

From the system of equations described in (3) above, the equations for the acceleration of the clutch slip of the oncoming and offgoing clutch controlled in the torque phase are selected. In this example, there are only two clutches controlled during the torque phase:

$$s_{\dot{\omega}_{PriOffg}} \rightarrow T_{PriOffg} = \Sigma(T_i k_i) \quad (4),$$

$$s_{\dot{\omega}_{PriOnc}} \rightarrow T_{PriOnc} = \Sigma(T_j k_j) \quad (5),$$

where PriOffg is clutch C2 in the example transmission system 10, PriOnc is clutch C5, and $k_i$, $k_j$ represent the numeric coefficients which accompany the components of the equation on the right side of the equation when solved for the clutch torque on the left side of the equation.

The coefficients a, b, c, etc. of the derived equations (1) and (2) above are derived from solving (4) and (5) in terms of the primary offgoing and primary oncoming clutch torques and are stored in a calibration lookup table in the controller 70. Next, the target clutch torque values at which to begin the offgoing capacity and end the oncoming capacity for the torque phase of the commanded shift are calculated. Clutch torque can be ramped to execute the torque phase between these values, where the offgoing clutch torque ramps from the initial value down to zero and the oncoming clutch torque ramps from zero up to the final desired value.

Calculation of the scheduled input torque and clutch torques during the inertia phase is accomplished by accessing a different set of coefficients stored in a calibration lookup table for the commanded shift. In the case of the 5th gear to 6th gear upshift of the transmission system 10, two clutch torques are calculated for the inertia phase. One will be the primary oncoming clutch PriOnc that was used in the torque phase (i.e., clutch C5), and the other will be a clutch torque to perform a controlled release (or increase of slip) on one of the clutches that was previous held locked during the torque phase (referred to as the secondary offgoing clutch), i.e., clutch C6 in the transmission system 10.

Specifically, the controller accesses the previously stored coefficients $a_{12}$, $b_{12}$, etc., for these two clutches and uses them to solve the three equations (6), (7), and (8) below as a function of desired output torque, desired input angular acceleration and desired clutch slip accelerations:

$$T_{PriOnc} = a_{12} T_{OUTPUT} + b_{12} \dot{\omega}_{INPUT} + c_{12} \dot{\omega}_{PriOnc} + d_{12} \dot{\omega}_{SecOffg} \quad (6)$$

$$T_{SecOffg} = a_{13} T_{OUTPUT} + b_{13} \dot{\omega}_{INPUT} + c_{13} \dot{\omega}_{PriOnc} + d_{13} \dot{\omega}_{SecOffg} + e_{13} T_{PriOnc} \quad (7)$$

$$T_{INPUT} = a_{14} T_{PriOnc} + b_{14} T_{SecOffg} + c_{14} \dot{\omega}_{INPUT} + d_{14} \dot{\omega}_{PriOnc} \quad (8)$$

Equations (6), (7), and (8) are derived from another set of equations (9) below that describe the transmission system 10 using the free body diagram approach described above. This system will be different from the one used for the torque phase calculations (3), in that one of the holding clutch constraints from $\Phi$ will be removed for the secondary offgoing clutch C6, as it is not locked during the inertia phase of the upshift.

$$\begin{bmatrix} I & \Phi^T \\ \Phi & 0 \end{bmatrix}^{-1} [\Sigma T] = \begin{bmatrix} \dot{\omega} \\ \lambda \end{bmatrix} = S = \begin{bmatrix} s_1 \\ s_2 \\ \vdots \\ s_n \end{bmatrix} \quad (9)$$

The equations (10), (11), and (12) below for the angular acceleration at the primary oncoming clutch, secondary offgoing clutch, and input node (input member 14 or sun gear member 22) are selected from equation (9) and solved to provide the coefficients used in (6), (7), and (8) that are stored in the lookup table.

$$s_{\dot{\omega}_{PriOnc}} \rightarrow \dot{\omega}_{PriOnc} = \Sigma(T_i k_i) \quad (10)$$

$$s_{\dot{\omega}_{SecOffg}} \rightarrow \dot{\omega}_{SecOffg} = \Sigma(T_i k_i) \quad (11)$$

$$s_{\dot{\omega}_{INPUT}} \rightarrow \dot{\omega}_{INPUT} = \Sigma(T_i k_i) \quad (12)$$

The results from these calculations provide the controller 70 with the clutch torques to command the torque phase of the upshift, followed by the clutch and input torques to command the inertia phase to achieve the desired output torque, torque phase time, and inertia phase time.

At the end of the inertia phase (i.e. at time T3 in FIGS. 2-4), it is desired that the input speed (speed 114 of the input member 14 in FIG. 2), will have reached the target for the commanded gear, which in this example is the 6th gear, and that both the primary and secondary oncoming clutch PriOnc1, PriOnc2 (i.e., clutches C1 and C5 in the example upshift of FIGS. 2-4), will have reached zero slip speed. At that time, the secondary offgoing clutch is exhausted (clutch C6 in this example, as shown by torque 104 in FIG. 2), and the primary and secondary oncoming clutches are locked (as shown by torques 102 and 106 in FIG. 2). Input torque is reduced to the appropriate level to provide the desired commanded gear torque ratio (ideally allowing flat output torque from the inertia phase of the shift). As used herein, input torque control can be accomplished by engine management control, as an engine operatively connected to the transmission input member provides the input torque. As shown in FIG. 2, torque 110 of the input member 14 is reduced at time T4 to a constant level that is commensurate with that of the 6th gear.

The secondary oncoming clutch SecOnc (i.e., the clutch that has a torque carrying direction in the higher gear opposite to the slip direction during the shift) would be filled and staged slightly below zero torque capacity during the inertia phase. When it reaches sync (zero slip across the clutch) at time T3, pressure can be rapidly increased to lock the clutch such that slip does not increase in magnitude. For example, in the example shift, clutch C1 is the secondary oncoming clutch. As shown in FIG. 4, in a final ramp-up torque phase between times T3 and T4, the clutch C1 is rapidly filled so that its torque 102 reaches the required torque level for the commanded gear (6th gear).

Accordingly, in the example upshift to which the method 500 of FIG. 9 is applied, the clutch C1 cannot apply the correct direction of reaction torque (positive) to produce 6th gear torque ratio because of the clutch slip direction present during the shift (negative) as indicate in FIG. 2. In the case of a power-on downshift (6th gear to 5th gear), the clutch C1 would have to increase in slip in a positive direction to continue to provide 6th gear torque ratio during the inertia phase, which is not directionally correct to attain the gearbox speed ratio of 5th gear (where clutch slip of clutch C1 is negative).

FIG. 2 shows input torque 110, output torque 112 and clutch torque (plots 100, 102, 104 and 106) during the 5-6 upshift. The torque phase from T1 to T2 is where the torque exchange between the primary oncoming C5 and primary offgoing clutch C2 is performed. Capacity of clutch C6 does not change, but the reaction torque 104 at that clutch decreases as the torque ratio decreases. Note that in FIG. 2, the capacity of clutch C6 is shown as negative due to its torque carrying direction relative to input, and decreases in magnitude (moves towards zero) during the first phase. The torque ratio 118 (output torque/input torque, or TR) drops below 6th gear levels during the torque phase, requiring increased input torque 110 to compensate to prevent a drop in output torque 112. Effectively, an upshift past 6th gear is initiated as the gearbox torque ratio changes, then clutch slip is increased during the inertia phase (between T2 and T3) on one of the holding clutches C6 (torque 104) as the primary oncoming clutch C5 (torque 102) is engaged so that both an upshift and a downshift are occurring simultaneously during the inertia phase from T2 to T3. Once the application of the primary oncoming clutch C5 and controlled release of the secondary offgoing clutch C6 are performed during the inertia phase, slip at the mismatched secondary oncoming clutch C1 reaches zero at the end of the inertia phase at T3. At that time, the torque capacity of clutch C1 is increased to prevent a change in clutch slip and establish 6th gear.

FIG. 4 shows clutch slip speeds, as well as input and output member speed, during the 5th gear to 6th gear upshift. There are no changes in clutch slip during the first phase from T1 to T2. A combination of input torque and reaction torque at C5 and C6 are used to control input speed transition to commanded gear sync in 6th gear at T3. The transmission system 10 is controlled such that when input speed 200 reaches sync for 6th gear, slip at C1 reaches zero at the same time (i.e., T3). Slip at C1 is represented in FIG. 4 by the speed 115 of the sun gear member 32. The speed 117 of the sun gear member 32 at time T3 is zero. It is noted that because FIG. 4 shows plots of angular acceleration, torque, and rotational speeds, the zero torque is indicated but the zero for speed 115 is not on the vertical axis. Before this time, slip at C1 was negative with respect to input, therefore the clutch C1 could not provide the positive direction reaction torque required for 6th gear torque ratio. Once the slip is zero and the clutch C1 has been synchronized, torque capacity can be increased to prevent a change in clutch slip and provide a reaction torque in the required torque direction (positive direction).

Calculate Downshift Scheduled Torques

Figure 8:
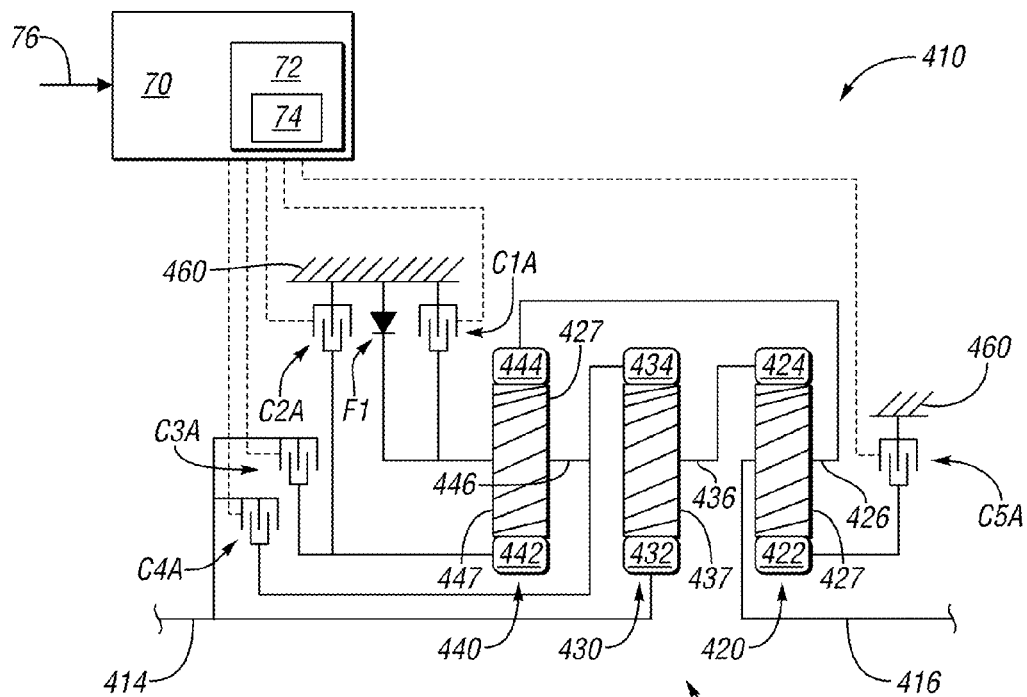
FIG. 8 is a schematic illustration of a second embodiment of an automatic transmission system in stick diagram form.

The method of executing a double transition shift 500 described in FIG. 8 can also be implemented for a downshift in which one of the four clutches involved in the shift has a slip direction relative to the input member during the shift different than a required torque-carrying direction in the offgoing gear (if an offgoing clutch) or in the oncoming gear (if an oncoming clutch). For a power-on downshift, the scheduled clutch torque values are first commanded to execute a torque phase in preparation for an inertia phase that will allow a controlled shift without a non-feasible reaction torque on the mismatched clutch. In one example, the shift from 6th gear to 5th gear in the transmission system 10 described above, the mismatched clutch is not one of the oncoming clutches, but an offgoing clutch (clutch C1) that, except for method 500, would not be able to provide the correct combination of slip acceleration and reaction torque in the inertia phase while input speed is increasing to the commanded gear target (5th gear).

Figure 7:
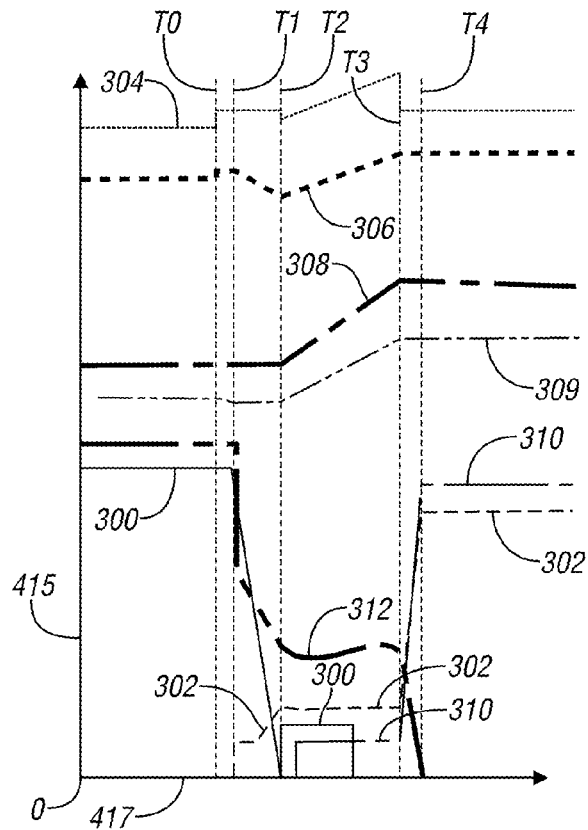
FIG. 7 is a plot of torque, rotational speed and clutch slip speed during the downshift of FIG. 5 of various components of the transmission system of FIG. 1.

In this example downshift from 6th gear to 5th gear, there are four clutches involved, which are the same four clutches as in the example upshift from 5th gear to 6th gear, except the oncoming and offgoing gears are reversed so that the four clutches are: primary oncoming PriOnc (i.e., clutch C6), secondary oncoming (i.e., clutch C2), primary offgoing (i.e., clutch C1) and secondary offgoing (i.e., clutch C5). This downshift is indicated as being initiated by a tip in by the driver at time T0, shown in FIG. 7. FIG. 7 is a plot of torque in N-m (or speed in rpm, as applicable) on the vertical axis 415 versus time in seconds on the horizontal axis. It is noted that input torque 304 and output torque 306 are relative to a different scale than torques 300, 302, 310, 312 of the clutches (C1, C6, C2, and C5, respectively). Additionally, input speed 308 and slip speed 309 of clutch C6 are relative to a different scale than the torque curves. The controller 70 then begins the control of clutch torque capacities at time T1, by controlling the primary oncoming clutch C6 and primary offgoing clutch C1 to execute a torque phase between the current gear (i.e., 6th gear, shown to the left of time T0), and another ratio (in this case, 7th gear) other than the final intended commanded gear (i.e., 5th gear, shown to the right of time T4). After that, at time T2, a second phase (i.e., a combined inertia and slip phase) is executed where the primary oncoming clutch (i.e., C6) and the secondary offgoing clutch (i.e., C5) are used to control both the input speed profile (speed of the input member 14) between the attained and commanded gear as well as the output torque transition (torque at the output member 16). In each phase, input torque control in parallel with clutch torque control produce the desired output torque response from the transmission system 10.

Calculation of the scheduled clutch torque values during the first phase is accomplished by accessing yet another set of coefficients stored in a lookup table for the type of shift. The coefficients are derived from another set of equations (13) below that describe the transmission system 10 using the free body diagram approach described above:

$$\begin{bmatrix} I & \Phi^T \\ \Phi & 0 \end{bmatrix}^{-1} [\Sigma T] = \begin{bmatrix} \dot{\omega} \\ \lambda \end{bmatrix} = S = \begin{bmatrix} s_1 \\ s_2 \\ \vdots \\ s_n \end{bmatrix}, \quad (13)$$

where T is torque of a component, $\dot{\omega}$ is angular acceleration of the component; $\lambda$ represents the torque required to maintain constraints between components, $\Phi$ is a system (also in matrix form) of any velocity constraint equations and torque constraint equations that describe angular speed (radians per second), angular acceleration (radians per second-squared) and torque relationships of the relative components of the transmission system 10 connected by a rigid connection, by a gear ratio of a gear set, or indicating that components are locked (i.e., rotate in unison for a rotating clutch or grounded (stationary) for a grounding clutch); and S is the output matrix when the system of equations is solved in terms of $\dot{\omega}$ and $\lambda$. In this case, when creating the lookup table, the conditions described in $\Phi$ contain any constraints for clutches that are locked during the initial torque phase.

The equation for the acceleration of the clutch slip of the oncoming and offgoing clutch controlled in the first phase (time T1 to time T2) is selected. In this case, there are only two clutches controlled during the first phase, the primary offgoing clutch PriOffg and the primary oncoming clutch PriOnc:

$$s_{\dot{\omega}_{PriOffg}} \rightarrow T_{PriOffg} = \Sigma(T_i k_i) \quad (14),$$

$$s_{\dot{\omega}_{PriOnc}} \rightarrow T_{PriOnc} = \Sigma(T_j k_j) \quad (15),$$

where PriOffg is clutch C1 in the example transmission system 10, and PriOnc is clutch C6.

The equations (14), (15) are then solved to find oncoming and offgoing clutch torque in terms of output torque $T_{OUTPUT}$, input torque $T_{INPUT}$ and desired input acceleration $\dot{\omega}_{INPUT}$ as shown in equations (16) and (17) below. In some embodiments, the input acceleration $\dot{\omega}_{INPUT}$ during the torque phase can be zero, so the related coefficient may not be used. This provides the coefficients $a_{10}$, $b_{10}$, $c_{10}$, etc., that are stored in the lookup table in the controller 70 for this type of shift.

$$T_{PriOnc} = a_{10} T_{INPUT} + b_{10} T_{OUTPUT} + c_{10} \dot{\omega}_{INPUT} \quad (16)$$

$$T_{PriOffg} = a_{11} T_{INPUT} + b_{11} T_{OUTPUT} + c_{11} \dot{\omega}_{INPUT} \quad (17)$$

Next, the target clutch torque values at which the offgoing capacity of the primary offgoing clutch C1 begins (at time T1) and at which the oncoming capacity of the primary oncoming clutch C6 ends (at time T2) for the first torque phase are calculated. FIG. 7 shows the torque 300 of the primary offgoing clutch C1 and torque 302 of the primary oncoming clutch C6. Clutch torque can be ramped to execute the torque phase between these values, where the offgoing clutch torque ramps from the initial value down to zero and the oncoming clutch torque ramps from zero up to the desired value at time T2.

The torque 304 at the input member 14 is shown in FIG. 7. Scheduled input torque is determined as a function of the torque ratios the transmission is in at the start (time T1) and end (time T2) of the first phase. A second combined inertia and slip phase with input torque modified to ramp output torque occurs between times T2 and T3. Calculation of the scheduled input torque $T_{INPUT}$ and clutch torques during the second phase is done by accessing appropriate sets of stored coefficients derived by solving equations that relate these torques to desired output torque $T_{OUTPUT}$, desired input acceleration $\dot{\omega}_{INPUT}$ and desired clutch slip accelerations. In this case, two clutch torques $T_{PriOnc}$ (torque of clutch C6) and $T_{SecOffg}$ (torque of clutch C5) are calculated for the second phase. One will be the primary oncoming clutch that was used in the first phase, and the other will be a clutch torque to perform a controlled release (or increase of slip) on one of the clutches that was previous held locked during the first phase (referred to as the secondary offgoing clutch). In FIG. 7, until time T2, the torque 312 on clutch C2 is high enough to prevent slip from increasing and keep clutch C2 locked.

$$T_{PriOnc} = A_{12} T_{OUTPUT} + b_{12} \dot{\omega}_{INPUT} + c_{12} \dot{\omega}_{PriOnc} + d_{12} \dot{\omega}_{SecOffg} \quad (18)$$

$$T_{SecOffg} = a_{13} T_{OUTPUT} + b_{13} \dot{\omega}_{INPUT} + c_{13} \dot{\omega}_{PriOnc} + d_{13} \dot{\omega}_{SecOffg} + e_{13} T_{PriOnc} \quad (19)$$

$$T_{INPUT} = a_{14} T_{PriOnc} + b_{14} T_{SecOffg} + c_{14} \dot{\omega}_{INPUT} + d_{14} \dot{\omega}_{PriOnc} \quad (20)$$

It is also possible to solve equations in terms of clutch torque commands and desired output torque. In that case, whatever input torque was present would govern the output torque response for achieving the desired shift time. However, output torque is directly related to vehicle acceleration and driver perception of the shift. Due to the complicated nature of the control states involved in this type of shift, it may be preferable to control input torque profile to achieve output torque performance that resembles a traditional single transition clutch-to-clutch power-on downshift.

The system of equations (equation 21) that describe the transmission system 10 from which the coefficients for equations (18), (19), and (20) are derived will be different from the system of equations (i.e., equation 13) used for the first torque phase calculations, in that one of the holding clutch constraints from $\Phi$ will be removed for the secondary offgoing clutch (clutch C5 in the transmission system 10).

$$\begin{bmatrix} I & \Phi^T \\ \Phi & 0 \end{bmatrix}^{-1} [\Sigma T] = \begin{bmatrix} \dot{\omega} \\ \lambda \end{bmatrix} = S = \begin{bmatrix} s_1 \\ s_2 \\ \vdots \\ s_n \end{bmatrix} \quad (21)$$

The equations (22), (23), and (24) shown below for the acceleration $\dot{\omega}_{PriOnc}$ at the primary oncoming clutch (i.e., clutch C6), acceleration $\dot{\omega}_{SecOffg}$ at the secondary offgoing clutch (i.e., clutch C5), and acceleration $\dot{\omega}_{INPUT}$ at the input node (input member 14 and sun gear member 22) are selected and solved as a function of the desired output torque, desired input acceleration, and desired clutch slip acceleration:

$$s_{\dot{\omega}_{PriOnc}} \to \dot{\omega}_{PriOnc} = \Sigma(T_i k_i) \quad (22),$$

$$s_{\dot{\omega}_{SecOffg}} \to \dot{\omega}_{SecOffg} = \Sigma(T_i k_i) \quad (23),$$

$$s_{\dot{\omega}_{INPUT}} \to \dot{\omega}_{INPUT} = \Sigma(T_i k_i) \quad (24)$$

The results from these calculations provide the controller 70 with the clutch and input torque commands to execute the first phase of the downshift, followed by the clutch and input torque commands to execute the second phase to achieve the desired output torque profile shown as 306 in FIG. 7 to the commanded gear level (i.e., 5th gear), and desired torque phase and inertia phase time.

Figure 6:
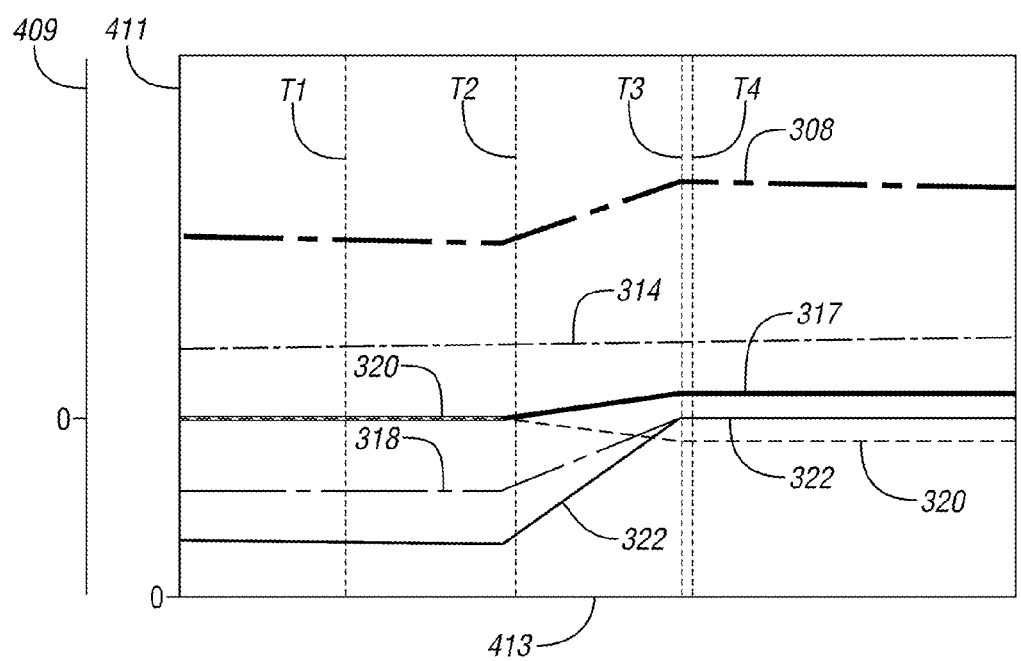
FIG. 6 is a plot of rotational speed of various components of the transmission system of FIG. 1 during the downshift of FIG. 5.

At the end of the second phase (i.e., at time T3), it is desired that input speed 308 in FIGS. 6 and 7 will have reached the target for the commanded 5th gear, and that both the primary oncoming clutch C6 (torque 302) and secondary oncoming clutch C2 (torque 310) will have reached zero slip speed. At that time, the secondary offgoing clutch C5 (torque 312) is exhausted, and the primary and secondary oncoming clutches C6, C2 are commanded to maximum pressure during a final ramp torque phase between time T3 and time T4. Input torque 304 is reduced to the appropriate level to provide the desired commanded gear torque ratio (ideally allowing flat output torque from the inertia phase of the shift). Input torque 304 then returns to a state where it is unmanaged by a controller request.

The secondary oncoming clutch C2 would be filled and staged slightly below zero torque capacity during the second phase, but would not have torque capacity until the end of the second phase when sync is reached (at time T3). When it reaches sync (zero slip across the clutch C2), pressure can be rapidly increased to lock the clutch such that slip does not increase in magnitude. FIG. 7 shows slip speed 309 of clutch C2. The slip speed 309 is zero at time T3. It is noted that because FIG. 7 shows plots of torque and speeds, the zero for the torque scale is indicated, but the zero for slip speed 307 is not indicated on the vertical axis.

Figure 5:
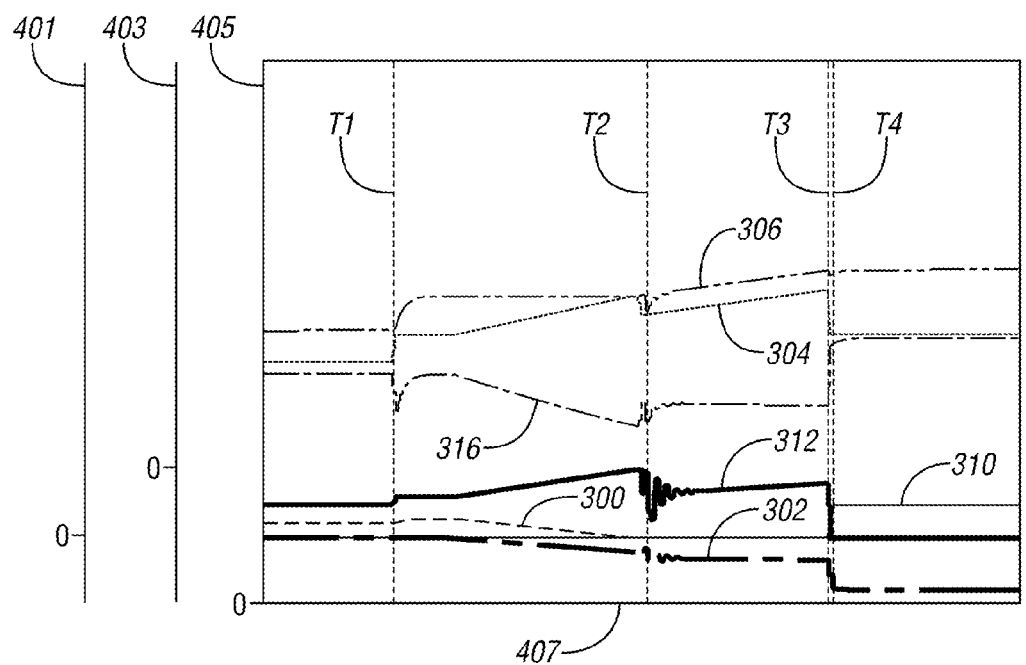
FIG. 5 is a plot of torque of various components and torque ratio of the transmission system of FIG. 1 during a controlled double transition downshift in the transmission of FIG. 1.

FIGS. 5 and 6 illustrate the example of power-on 6-5 downshift in the transmission system 10 using the method of FIG. 9. FIG. 5 shows clutch torque 401 in N-m, input torque 403 in N-m, and torque ratio 405 as vertical axes versus time 407 in seconds on the horizontal axis. FIG. 5 shows input torque 304, output torque 306, and clutch torque values during the shift. Primary oncoming clutch C6 torque 302, secondary oncoming clutch C2 torque 310, primary offgoing clutch C1 torque 300, and secondary offgoing clutch C5 torque 312 are shown. The speed 308 of the input member 14, the speed 314 of the output member 16, and the torque ratio 316 (torque of output member 16 to torque of input member 14) are shown.

FIG. 6 shows clutch slip speed 409 in N-m and input member speed 411 in N-m on the vertical axis versus time 413 in seconds on the horizontal axis. FIG. 6 shows clutch slip speeds before, during and after the shift, in addition to input member speeds 308 and output member speeds 314. The speed 317 of clutch C5, the speed 318 of clutch C6, the speed 320 of clutch C1, and the speed 322 of clutch C2 are shown.

The primary oncoming clutch C6 and primary offgoing clutch C1 are controlled during the first torque stage, which changes the torque ratio of the transmission system 10 as it drops below 6th gear. In this example, an increase in input torque 304 during the first phase is necessary to prevent a drop in output torque 306. The torque ratio 316 drop is necessary because clutch C1 cannot be used as an offgoing clutch during the inertia phase. In a controlled release of clutch C1, a positive slip speed is required to produce a positive reaction torque to achieve 6th gear output torque ratio 316. However, slip at clutch C1 increasing in a positive direction is opposite of what is required to transition the transmission system 10 to 5th gear speed ratio, in which slip at C1 is negative. Clutch C1 cannot go from locked (zero) to a negative value while providing a positive reaction torque. Accordingly, under the method 500 of FIG. 9 and as explained herein, the torque capacity on the mismatched clutch C1 is removed without requiring clutch C1 to provide a reaction torque at a non-zero slip speed.

After the mismatched clutch C1 has been exhausted, the primary oncoming clutch C6 and secondary offgoing clutch C5 are controlled during the inertia phase as shown by torques 302 and 312 in FIG. 5, in conjunction with input torque 304, to transition the input speed 308 of FIG. 6 to 5th gear sync while simultaneously transitioning output torque 306 from 6th to 5th gear level. At the end of the inertia phase at time T3, the secondary oncoming clutch C2 has synchronized at the same time as input speed reaches sync for 5th gear. Sync of the secondary oncoming clutch C2 before increasing torque capacity is necessary because clutch C2 provides a positive direction reaction torque in 5th gear but slip has been in a negative direction before and during the 6-5 power-on downshift. Because of this, torque capacity at clutch C2 cannot be used to assist in the ratio change until the clutch C2 has been synchronized. At the end of the second phase, the secondary offgoing clutch C5 is exhausted and capacity is increased on both the primary and secondary oncoming clutches C6, C2 to hold 5th gear and complete the shift.

Although the example upshift from 5th gear to 6th gear and the example downshift from 6th gear to 5th gear are single gear shifts, the method 500 described herein applies equally to double transition shifts that are skip shifts. FIG. 8 shows another embodiment of a transmission system 410 to which the method 500 of FIG. 9 can be applied. The transmission system 410 includes a transmission 412 with an input member 414, an output member 416, and a gearing arrangement of three planetary gear sets 420, 430, and 440. Each planetary gear set 420, 430, 440 has a respective sun gear member 422, 432, 442, ring gear member 424, 434, 444, and carrier member 426, 436, 446, that supports pinion gears 427, 437, 447 that mesh with both the sun gear member 422, 432, 442, and the ring gear member 424, 434, 444.

The transmission system 410 includes five clutches C1A, C2A, C3A, C4A, and C5A, and a one-way follower F1. The clutch C1A is engageable to connect the carrier member 446 to a stationary (nonrotating) member 460 such as the transmission casing. The clutch C2A is engageable to connect the sun gear member 442 to the stationary member 460. The clutch C3A is engageable to connect the sun gear member 442 to the input member 414. The clutch C4A is engageable to connect the continuously interconnected carrier member 446 and ring gear member 434 to the input member 414 and sun gear member 432. The clutch C5A is engageable to connect the sun gear member 422 to the stationary member 460. The follower F1 brakes the carrier member 446 in one direction of rotation.

The controller 70 is operatively connected to each of the clutches C1A-C5A The controller 70 has the processor 72 that carries out the stored algorithm 74 described above, also referred to herein as a control module or method 500, to engage the clutches C1A-C5A to establish the various gear ratios in response to input operating conditions 76 provided to the controller 70 by sensors or from other controllers, such as an engine controller.

Table 4 shows the clutch engagement schedule for the transmission system 410. An "X" indicates that a clutch is engaged and carrying torque. A "G" indicates a clutch engaged and carrying torque in a garage shift. An "O" indicates a clutch is engaged but not carrying torque. A "C" indicates a clutch is engaged and carrying torque for purposes of manual range coasting.

TABLE 4

| Gear State | Gear Ratio | Ratio Step | C1A | C2A | C3A | C4A | C5A | F1 |
|---|---|---|---|---|---|---|---|---|
| Rev | −2.943 | | | X | | G | | |
| Neutral | | −0.64 | O | | | | | |
| 1st | 4.584 | | C | | | | G | X |
| 2nd | 2.964 | 1.55 | | X | | | X | |
| 3rd | 1.912 | 1.55 | | | X | | X | |
| 4th | 1.446 | 1.32 | | | | X | X | |
| 5th | 1.000 | 1.45 | | | X | X | | |
| 6th | 0.746 | 1.34 | | X | | X | | |

Table 5 indicates the ratio of slip speed of each clutch C1A, C2A, C3A, C4A, C5A, F1 with respect to the speed of the input member 414 in each of the gear states.

TABLE 5

|  | Rev | 1st | 2nd | 3rd | 4th | 5th | 6th |
|---|---|---|---|---|---|---|---|
| C1A | 0 | 0 | −0.252 | −0.644 | −1.000 | −1.000 | −1.000 |
| C2A | −1.000 | 0.642 | 0 | −1.000 | −1.907 | −1.000 | 0 |
| C3A | 0 | 1.642 | 1.000 | 0 | −0.907 | 0 | 1.000 |
| C4A | 1.000 | 1.000 | 0.748 | 0.356 | 0 | 0 | 0 |
| C5A | 1.810 | 0 | 0 | 0 | 0 | −1.000 | −2.102 |
| F1 | 0 | 0 | −0.252 | −0.644 | −1.000 | −1.000 | −1.000 |

Table 6 indicates the ratio of torque of each clutch C1A, C2A, C3A, C4A, C5A, F1 with respect to torque at the input member 114 in each of the gear states.

TABLE 6

|  | Rev | 1st | 2nd | 3rd | 4th | 5th | 6th |
|---|---|---|---|---|---|---|---|
| C1A | −3.943 | 0 | 0 | 0 | 0 | 0 | 0 |
| C2A | 0 | 0 | 0.551 | 0 | 0 | 0 | −0.254 |
| C3A | 1 | 0 | 0 | 0.355 | 0 | −0.34 | 0 |
| C4A | 0 | 0 | 0 | 0 | 0.685 | 1.34 | 1 |
| C5A | 0 | 1.413 | 1.413 | 0.912 | 0.446 | 0 | 0 |
| F1 | 0 | 2.171 | 0 | 0 | 0 | 0 | 0 |

It is apparent from Tables 5 and 6 that an upshift from 2nd gear to 5th gear presents a double transition shift with a similar challenge as in the 5th-6th upshift and 6th-5th downshift described with respect to transmission system 410. Namely, in the 2nd-5th upshift, oncoming clutch C3A has a negative torque ratio with respect to input in the oncoming 5th gear, but has a positive slip speed with respect to input in the offgoing 2nd gear. Slipping clutch C3A during an upshift from 2nd gear to 5th gear will not provide the required direction of reaction torque to provide appropriate output torque and input acceleration performance during the shift. As used herein, in the 2nd-5th skip shift, C2A is the first clutch, C5A is the second clutch, C3A is the third clutch, and C4A is the fourth clutch. As used herein, in the 5th-2nd skip shift, C3A is the first clutch, C4A is the second clutch, C2A is the third clutch, and C5A is the fourth clutch.

FIG. 9 shows a method 500 of executing a double transition shift, as described above with respect to the 5th-6th upshift in the transmission system 10, the 6th-5th downshift in the transmission system 10, and as can be applied to the 2nd-5th or 5th-2nd skip shift of transmission system 410. The method 500 begins with step 502, with the controller 70 receiving a double transition shift request that the controller 70 determines in step 504 involves a clutch that has a clutch slip direction in either the oncoming or the offgoing gear that is different than the torque-carrying direction in the other of the offgoing or oncoming gear. Step 504 can be based on stored information regarding the specific shift, so that the shift is identified as a specific shift requiring implementation of the method 500.

In preparation for accomplishing the shift, the controller 70 calculates a torque phase time in step 506. The torque phase time can be calibrated based on the level of vehicle acceleration associated with the shift, as described herein. Next, the controller 70 determines the torques to be commanded during the torque phase for at least some of the clutches involved in the shift, for the input member 14 (or 114 in FIG. 8) and for the output member 16 (or 116) in FIG. 8 to be controlled during the torque phase. Equations (1), (2), (3), (16), and (17) described herein provide the torques determined under step 508. The controller 70 then controls the clutch, input member, and output member torques in the torque phase under step 510 according to the determinations of step 508. It is noted that for the 5-6 upshift described herein, the output member torque remains constant during the shift. Step 510 may include locking a clutch at a given torque if such is determined under step 508.

Prior to the inertia phase of the shift, the controller 70 calculates the inertia phase time, input member acceleration and clutch slip acceleration in step 512. Equations (10)-(12) described herein are one example of how the acceleration values are calculated. Next, the inertia phase clutch, input member, and output member torques are calculated in step 514, such as is explained with respect to equations (6)-(9) and (18)-(20). The controller 70 then controls the inertia phase clutch, input member, and output member torques under step 516 according to the determinations of step 514. Step 516 may include locking a clutch at a given torque if such is determined under step 514. It is noted that for the 5-6 upshift described herein, the output member torque 112 remains constant during the inertia phase while the input member speed 200 is brought to that of the 6th gear, and slip of the problematic clutch (here clutch C1) is brought to zero. For the 6-5, downshift, output torque 306 had dropped to 7th gear level at the end of the torque phase, and is now brought to 5th gear level by ramping input torque 309 and controlling slip on the clutches C5 and C6. If the mismatched clutch is one of the offgoing clutches, it may provide reaction torque during this phase when clutch slip is zero or the same as required torque direction.

In step 518, closed loop control is performed by the controller 70 on the two clutches controlled in the inertia phase (C5 and C6) to meet the requirements of the input member 14 (or 114) and the output member 16 (or 116) at the oncoming gear while ensuring that the mismatched clutch does not carry torque or slip until the slip has reached zero, and the slip direction will be the same as the required torque direction in the gear (offgoing or oncoming) in which the clutch carries torque. To perform the closed loop control, the controller 70 periodically determines in substep 520 whether the speed of the input member 14 (or 114) and the clutch slip speeds of the clutches slipping in the inertia phase are at sync with the requirements of the oncoming gear. If the speed of the input member and the clutch slip speeds are not at the levels required for the oncoming gear, the controller 70 adjusts the pressure on the slipping clutches in step 516 until sync is achieved. Once sync is achieved, the controller 70 executes a final ramp-up torque phase in step 522 to bring the torque on the two oncoming clutches to the required level in a short period of time. If the mismatched clutch is one of the offgoing clutches, it will not carry torque until the ramp-up torque phase.

Figure 10:
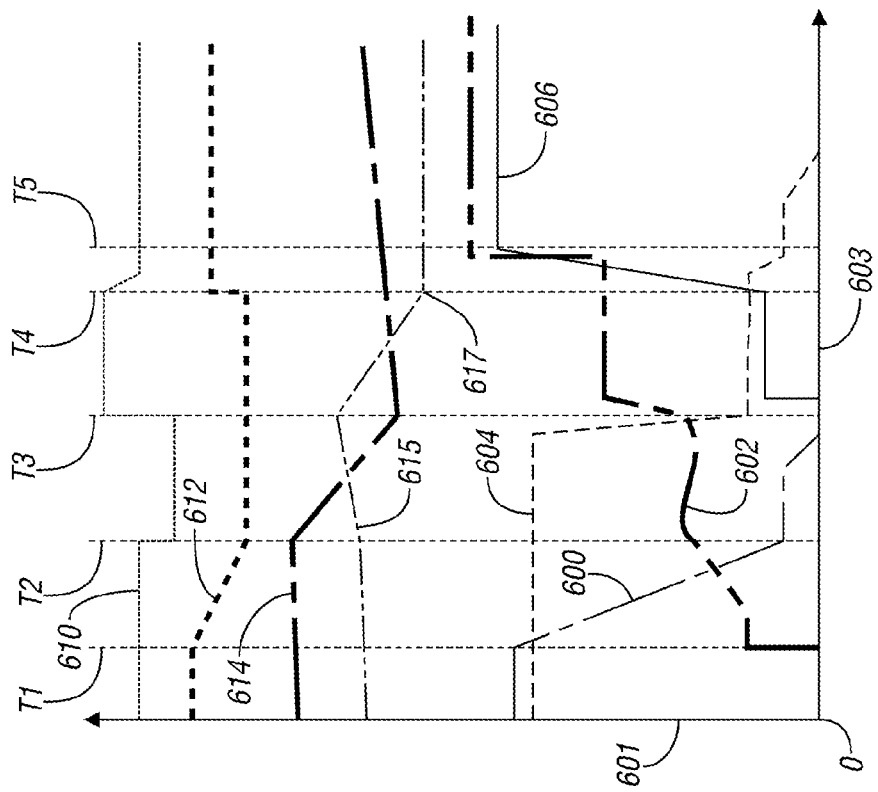
FIG. 10 is a plot of torque, rotational speed and clutch slip speed during an alternative controlled double transition downshift of various components of the transmission system of FIG. 1.

FIG. 10 is an alternative example of an upshift from 5th gear to 6th gear for the transmission system 10 of FIG. 1 using the method 500 of FIG. 9 that accesses a different set of stored coefficients to determine torque phase and inertia phase clutch, input, and output torques according to the equations (1)-(10) described herein. FIG. 10 shows component speeds in rpm and component torques in N-m, as applicable, on the vertical axis 601 versus time in seconds on the horizontal axis 603. Torque 600 of the primary offgoing clutch C2, torque 602 of the primary oncoming clutch C5, torque 604 of the secondary offgoing clutch C6, and torque 606 of the secondary oncoming clutch C1 are shown. Torque 610 of the input member 14 and torque 612 of the output member 16 are also shown. The speed 614 of the input member 14 and the speed 615 of the sun gear member 32 are shown. In FIG. 10, all clutch torques are shown in relative magnitude without regard to direction of rotation. Moreover, it is noted that input torque 610 and output torque 612 are relative to a different scale than torques 600, 602, 604, and 606. Additionally, input speed 614 and slip speed 615 of sun gear member 32 are relative to a different scale than the torque curves, and zero torque is indicated on the vertical axis 601 but the zero for speed is not on the vertical axis. Slip at clutch C1 is represented by the speed 615 of the sun gear member 32. The speed of the sun gear member 32 is zero at time T4, as indicated at 617.

Times T1, T2, T3, T4 and T5 indicate the beginning, end, and different phases of the upshift, but are not necessarily numerically the same as used in other plots herein. Until time T1, the transmission system 10 is in 5th gear. The output torque 612 is not held constant during the shift. Between times T1 and T2, a torque phase of the shift occurs in which output torque drops from 5th gear level to 7th gear level. Between times T2 and T3, an inertia phase of the shift occurs with output torque 612 changing from 5th gear level to 7th gear level. The inertia phase ends at time T3, when input speed 614 reaches that of 6th gear. Between times T3 and T4, a slip phase of the shift occurs, in which the speed 615 of the sun gear member 32 reaches zero at 617. Between times T4 and T5, a final ramp-up torque phase occurs in which torque 606 of clutch C1 is brought to 6th gear level and the torque 604 at clutch C6 is released.

Accordingly, the upshift strategy of FIG. 10 has an initial torque phase, an inertia phase, a slip phase, and a final torque phase. The inertia phase and slip phases are not combined. The output torque drops to 7th gear level and remains there during the shift before jumping to 6th gear level at the end of the shift. A positive input torque request is required during the slip phase in order to maintain the 7th gear output torque level. The inertia and slip phases can have closed loop control of clutches, such as of the torque of clutch C5 and C6 during the slip phase, and/or of clutches during the inertia phase to offset the effect of any error between the requested and actual input torque 610.

Figure 11:
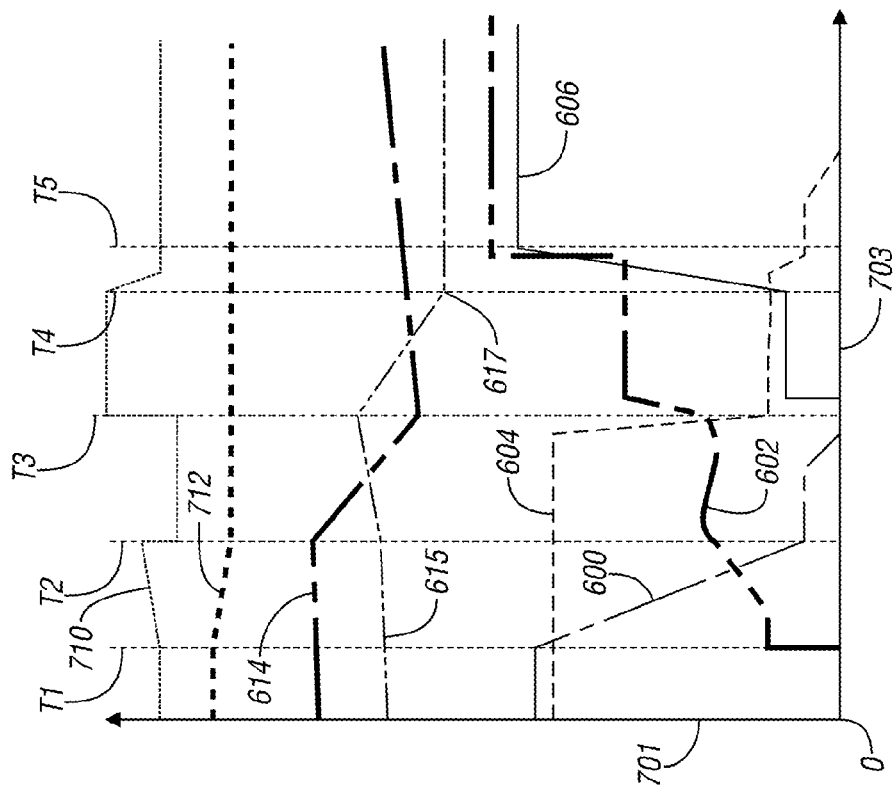
FIG. 11 is a plot of torque, rotational speed and clutch slip speed during another alternative controlled double transition downshift of various components of the transmission system of FIG. 1.

FIG. 11 shows another alternative example of an upshift from $5^{th}$ gear to $6^{th}$ gear for the transmission system 10 of FIG. 1 using the method 500 of FIG. 9 that accesses a different set of stored coefficients to determine torque phase and inertia phase clutch, input, and output torques according to the equations (1)-(10) described herein. FIG. 11 shows component speeds in rpm and component torques in N-m, as applicable, on the vertical axis 701 versus time in seconds on the horizontal axis 703.

Torque 710 of the input member 14 and torque 712 of the output member 16 are different than the input torque 610 and the output torque 612 of FIG. 10 because in the upshift strategy of FIG. 11, torque hole fill is used during the torque phase from T1 to T2 by controlling the input torque 610 to increase, resulting in output torque 712 moving to the 6th gear level and remaining at that level during the inertia phase and the slip phase, rather than dropping to 7th gear level. Thereafter, input torque 710 is modified during the inertia phase and during the slip phase similarly to the modification of input torque 610 in FIG. 10. Torque 600 of the primary offgoing clutch C2, torque 602 of the primary oncoming clutch C5, torque 604 of the secondary offgoing clutch C6, and torque 606 of the secondary oncoming clutch C1 are the same as described with respect to the upshift of FIG. 10. The speed 614 of the input member 14 and the speed 615 of the sun gear member 32 are also as described with respect to FIG. 10. In FIG. 11, all clutch torques are shown in relative magnitude without regard to direction of rotation. Moreover, it is noted that input torque 710 and output torque 712 are relative to a different scale than torques 600, 602, 604, and 606. Additionally, input speed 614 and slip speed 615 of sun gear member 32 are relative to a different scale than the torque curves, and zero torque is indicated on the vertical axis 701 but the zero for speed is not on the vertical axis. Slip at clutch C1 is represented by the speed 615 of the sun gear member 32. The speed of the sun gear member 32 is zero at time T4, as indicated at 617. As with the upshift strategy of FIG. 10, closed loop control of the clutch torques such as of the torque of clutch C5 and C6 during the slip phase, and/or of clutches during the inertia phase can be used to offset the effect of any error between the requested and actual input torque 710.

Figure 12:
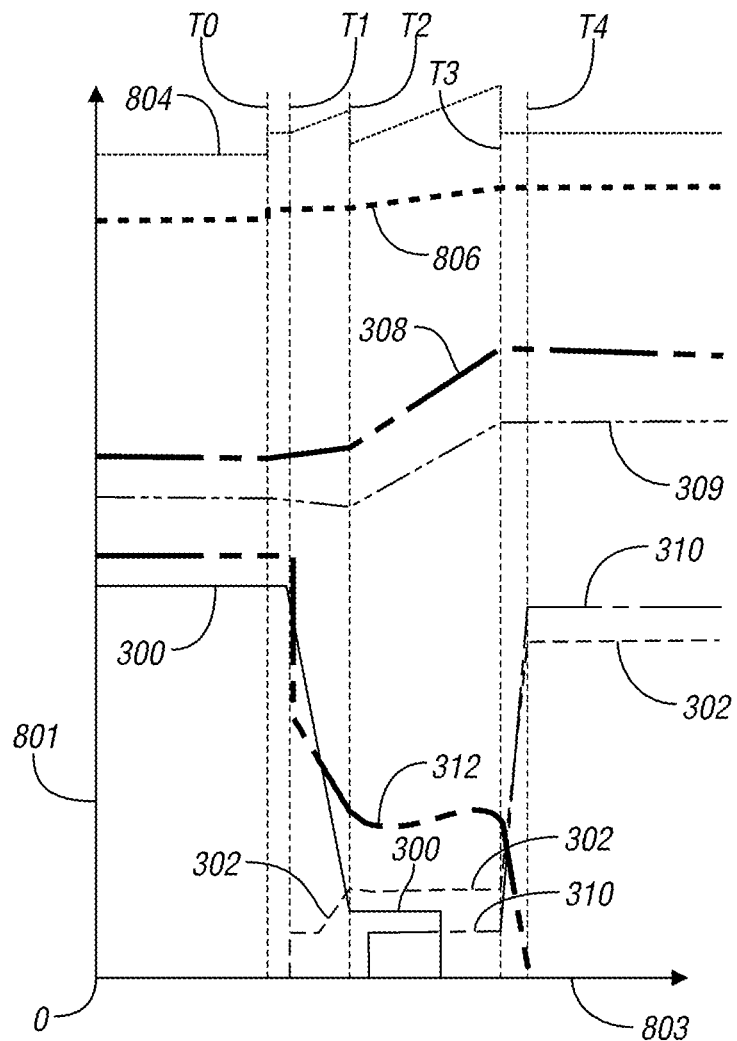
FIG. 12 is a plot of torque, rotational speed and clutch slip speed during an alternative controlled double transition downshift of various components of the transmission system of FIG. 1.

FIG. 12 is an alternative example of a downshift from $6^{th}$ gear to $5^{th}$ gear for the transmission system 10 of FIG. 1 using the method 500 of FIG. 9 that accesses a different set of stored coefficients to determine torque phase and inertia phase clutch, input, and output torques according to the equations (13)-(24) described herein. FIG. 12 shows component speeds in rpm and component torques in N-m, as applicable, on the vertical axis 801 versus time in seconds on the horizontal axis 803. FIG. 12 shows the torque 300 of the primary offgoing clutch C1, the torque 302 of the primary oncoming clutch C6, the torque 804 of the input member 14, the torque 806 of the output member 16, the speed 308 of the input member 14, the slip speed 309 of the primary oncoming clutch C6, the torque 310 of the secondary oncoming clutch C2, and the torque 312 of the secondary offgoing clutch C5. The clutch torques 300, 302, 310, 312, the speed 308 of the input member 14, and the slip speed 309 of the primary oncoming clutch C6 are as described with respect to the downshift strategy of FIG. 7. The torque 804 of the input member 14 and the torque 806 of the output member 16 are different than the corresponding torques 304, 306 in the alternative downshift strategy of FIG. 7 as torque hole fill is used during the torque phase of the downshift of FIG. 12 (between times T1 and T2) by increasing the input torque request, resulting in higher input torque 804 and a resulting output torque 806 that does not drop to the 7th gear level, but instead remains constant during the torque phase from T1 to T2, and increases slightly to the 5th gear level by the end of the combined inertia and slip phase between times T2 and T3. The input torque 804 increases during the torque phase from T1 to T2, then is reduced before increasing to an even higher level by the end of the combined inertia and slip speed phase at time T3. After time T3, the input torque 804 remains at the 5th gear level. As with the downshift strategy of FIG. 7, closed loop control of the clutch torques such as of the torque of clutch C5 and C6 during the combined inertia and slip phase can be used to offset the effect of any error between the requested and actual input torque 804.

By using stored coefficients based on free body kinematic equations of a transmission system, and by controlling clutch and input torques during a shift to ensure that a transitioning clutch that has a clutch slip direction relative to the direction of input rotation opposite to a torque direction relative to input torque direction does not carry torque until its slip speed is zero or in the same direction as a torque direction, smooth double transition shifts can be executed in a relatively short shift time.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of executing a double transition shift in a transmission having a plurality of selectively engageable clutches engageable in different combinations to establish multiple different gears with gear ratios of torque of an output member to torque of an input member, the method comprising:
   receiving a command for a double transmission shift from a current gear to a commanded gear; wherein the double transition shift requires at least four clutches including a first offgoing clutch and a second offgoing clutch that are engaged in the current gear and not engaged in the commanded gear, and a first oncoming clutch and a second oncoming clutch that are not engaged in the current gear and are engaged in the commanded gear;
   determining via a controller that one of the four clutches has a clutch slip direction relative to input member rotation direction in one of the current gear and the commanded gear and an opposite clutch torque direction relative to input member torque direction in the other of the current gear and the commanded gear;
   calculating clutch torques for the first offgoing clutch and the first oncoming clutch;
   controlling torque at the offgoing clutches and the oncoming clutches during the shift according to said calculated clutch torques to:
      ensure that said one of the four clutches provides reaction torque during the shift only if slip across said one of the four clutches is zero or in the clutch torque direction relative to input member torque direction in the other of the current gear and the commanded gear; and
      cause slip across said one of the four clutches to be zero or in the clutch torque direction relative to input member torque direction in the other of the current gear and the commanded gear.

2. The method of claim 1, further comprising:
   applying torque at said one of the four clutches to engage said one of the four clutches only after clutch slip across said one of the four clutches is zero or in the clutch torque direction relative to input member torque direction in the other of the current gear and the commanded gear.

3. The method of claim 1, wherein said one of the four clutches is the second oncoming clutch and said double transition shift is an upshift; and wherein said controlling includes:
   reducing torque at the first offgoing clutch and increasing torque at the first oncoming clutch while the second offgoing clutch is locked in a torque phase, and
   controlling torque at the first oncoming clutch and increasing slip at the second offgoing clutch in a subsequent inertia phase so that slip across the second oncoming clutch is zero at an end of the inertia phase, and input speed reaches that of the commanded gear at the end of the inertia phase while output member torque is maintained at output torque level of the current gear during the torque and inertia phases.

4. The method of claim 3, further comprising:
   increasing torque on the first and second oncoming clutches to predetermined torque levels of the commanded gear, and exhausting the second offgoing clutch in a ramp-up phase following the inertia phase while simultaneously reducing input member torque to a predetermined input torque level of the commanded gear; and
   locking the first and second oncoming clutches at zero slip speed.

5. The method of claim 1, wherein said controlling is according to selected time periods for a torque phase and an inertia phase of the shift.

6. The method of claim 1, wherein said calculating clutch torques is according to a first set of stored equations for the torque phase and a second set of stored equations for the inertia phase;
   wherein the first set of stored equations and the second set of stored equations are based on kinematic analysis of the transmission; and
   wherein the first set of equations accounts for the second offgoing clutch being locked in the torque phase.

7. The method of claim 1, wherein said calculated clutch torques are based on output member torque, input member torque, input member acceleration, and clutch slip acceleration.

8. The method of claim 1, further comprising:
   calculating input member torque based on the calculated clutch torques, input member acceleration, and clutch slip acceleration; and
   controlling torque at the input member according to the calculated input member torque.

9. The method of claim 1, wherein said one of the four clutches is the first offgoing clutch and said double transition shift is a downshift; and wherein said controlling includes:
   reducing torque at the first offgoing clutch and increasing torque at the first oncoming clutch while increasing input member torque in an initial torque phase to cause the output member torque to drop to a level corresponding with a higher gear having a lower torque ratio than the commanded gear;
   controlling torque of the first oncoming clutch and of the second offgoing clutch while increasing input member torque in a subsequent combined inertia and slip phase so that speed of the input member and torque of the output member are those of the commanded gear, and slip of the first and second oncoming clutches is zero at the end of the combined inertia and slip phase; and
   controlling torque at the first and second oncoming clutches to ramp to the commanded gear torque in a ramp-up phase following the combined inertia and slip phase.

10. The method of claim 9, wherein said controlling is according to selected time periods for the torque phase and the combined inertia and slip phase of the shift.

11. The method of claim 9, wherein said calculating clutch torques is according to a first set of stored equations for the torque phase and a second set of stored equations for the combined inertia and slip phase;
wherein the first set of stored equations and the second set of stored equations are based on kinematic analysis of the transmission; and
wherein the first set of equations accounts for the second offgoing clutch being locked in the torque phase.

12. The method of claim 1, wherein said controlling torque at the offgoing clutches and the oncoming clutches is via closed loop during the shift.

13. A transmission system comprising:
an input member;
an output member;
a gearing arrangement;
a plurality of selectively engageable clutches engageable in different combinations to establish a plurality of different gears through the gearing arrangement, the different gears having different torque ratios of torque of the output member to torque of the input member; wherein said plurality of different clutches include a first clutch, a second clutch, a third clutch, and a fourth clutch;
wherein the first clutch and the second clutch are engaged and the third clutch and the fourth clutch are not engaged in one of said gears, and the first clutch and the second clutch are not engaged and the third clutch and the fourth clutch are engaged in another of said gears so that a shift from said one of said gears to said another of said gears is a double transition shift; wherein one of the four clutches has a clutch slip direction relative to input member rotation direction in said one of the gears and an opposite clutch torque direction relative to input member torque direction in said another of the gears;
a controller operatively connected to each of the selectively engageable clutches; wherein the controller has a processor configured to execute a stored algorithm that:
determines whether a commanded shift is for the double transition shift;
calculates clutch torques for at least some of the four clutches based on output member torque, input member torque, input member acceleration, and clutch slip acceleration if the commanded shift is for the double transition shift;
controls torque at the four clutches during the shift according to said calculated clutch torques to ensure that said one of the four clutches does not provide reaction torque during the shift unless slip across said one of the four clutches is zero or in the clutch torque direction relative to input member torque direction of said another of the gears;
wherein the first clutch is a first offgoing clutch, the second clutch is a second offgoing clutch, the third clutch is a first oncoming clutch, the fourth clutch is a second oncoming clutch; wherein said one of the four clutches is the second oncoming clutch and said double transition shift is an upshift;
reduces torque at the first offgoing clutch and increases torque at the first oncoming clutch while the second offgoing clutch is locked in a torque phase; and
controls torque at the first oncoming clutch and increases clutch slip at the second offgoing clutch in a subsequent inertia phase so that slip across the second oncoming clutch is zero at an end of the inertia phase, and input speed reaches that of said another of the gears at the end of the inertia phase while the output member torque is maintained at the output torque level of said one of the gears during the torque and inertia phases.

14. The transmission system of claim 13, wherein the controller further calculates input member torque based on the calculated clutch torques, input member acceleration, and clutch slip acceleration; and
controls input member torque according to the calculated input member torque.

15. The transmission system of claim 13, wherein the controller:
increases torque on the first and second oncoming clutches to predetermined torque levels of said another of the gears, and exhausts the second offgoing clutch in a ramp-up phase following the inertia phase while simultaneously reducing input member torque to a predetermined input torque level of said another of the gears; and
locks the first and second oncoming clutches at zero slip speed.

16. The transmission system of claim 13, wherein the shift is according to selected time periods for a torque phase and an inertia phase of the shift.

17. The transmission system of claim 13, wherein the calculated clutch torques are according to a first set of stored equations for the torque phase and a second set of stored equations for the inertia phase;
wherein the first set of stored equations and the second set of stored equations are based on kinematic analysis of the transmission; and
wherein the first set of equations accounts for at least one of the clutches being locked in the torque phase.

18. A transmission system comprising:
an input member;
an output member;
a gearing arrangement;
a plurality of selectively engageable clutches engageable in different combinations to establish a plurality of different gears through the gearing arrangement, the different gears having different torque ratios of torque of the output member to torque of the input member; wherein said plurality of different clutches include a first clutch, a second clutch, a third clutch, and a fourth clutch;
wherein the first clutch and the second clutch are engaged and the third clutch and the fourth clutch are not engaged in one of said gears, and the first clutch and the second clutch are not engaged and the third clutch and the fourth clutch are engaged in another of said gears so that a shift from said one of said gears to said another of said gears is a double transition shift; wherein one of the four clutches has a clutch slip direction relative to input member rotation direction in said one of the gears and an opposite clutch torque direction relative to input member torque direction in said another of the gears;
a controller operatively connected to each of the selectively engageable clutches; wherein the controller has a processor configured to execute a stored algorithm that:
determines whether a commanded shift is for the double transition shift;
calculates clutch torques for at least some of the four clutches based on at least some of output member torque, input member torque, input member acceleration, and clutch slip acceleration if the commanded shift is for the double transition shift;
controls torque at the four clutches during the shift according to said calculated clutch torques to ensure that said one of the four clutches does not provide reaction torque during the shift unless slip across said one of the four clutches is zero or in the clutch torque direction relative to input member torque direction of said another of the gears;
wherein the first clutch is a first offgoing clutch, the second clutch is a second offgoing clutch, the third clutch is a first oncoming clutch, the fourth clutch is a second oncoming clutch; wherein said one of the four clutches is the first offgoing clutch and said double transition shift is a downshift;
reduces torque at the first offgoing clutch and increases torque at the first oncoming clutch while increasing input member torque in an initial torque phase to cause the output member torque to drop to a level corresponding with a higher gear having a lower torque ratio than said another of the gears;
controls torque of the first oncoming clutch and of the second offgoing clutch while increasing input member torque in a subsequent combined inertia and slip phase so that speed of the input member and torque of the output member are those of said another of the gears, and slip of the primary and secondary oncoming clutches is zero at the end of the combined inertia and slip phase; and
controls torque at the first and second oncoming clutches to ramp to torque level of said another of the gears in a ramp-up phase following the combined inertia and slip phase.

19. The transmission system of claim 18, wherein the calculated clutch torques are according to a first set of stored equations for the torque phase and a second set of stored equations for the combined inertia and slip phase;
wherein the first set of stored equations and the second set of stored equations are based on kinematic analysis of the transmission; and
wherein the first set of equations accounts for the second offgoing clutch being locked in the torque phase.

* * * * *